US008922994B2

(12) United States Patent
Zawacki et al.

(10) Patent No.: US 8,922,994 B2
(45) Date of Patent: Dec. 30, 2014

(54) LOCKING MECHANISM

(71) Applicants: Jennifer Greenwood Zawacki, Hillsborough, NC (US); Vincent James DeCaro, Apex, NC (US); Jason Pratt Parrish, Durham, NC (US); Kishiko Itoh, Tokyo (JP); Hiroyuki Noguchi, Yokahama (JP); Eiji Shinohara, Kawasaki (JP); Kazuo Nakada, Sagamihara (JP)

(72) Inventors: Jennifer Greenwood Zawacki, Hillsborough, NC (US); Vincent James DeCaro, Apex, NC (US); Jason Pratt Parrish, Durham, NC (US); Kishiko Itoh, Tokyo (JP); Hiroyuki Noguchi, Yokahama (JP); Eiji Shinohara, Kawasaki (JP); Kazuo Nakada, Sagamihara (JP)

(73) Assignee: Lenovo (Singapore) Ltd. Pte., Singapore (SG)

( * ) Notice: Subject to any disclaimer, the term of this patent is extended or adjusted under 35 U.S.C. 154(b) by 277 days.

(21) Appl. No.: 13/624,341

(22) Filed: Sep. 21, 2012

(65) Prior Publication Data

US 2014/0085794 A1 Mar. 27, 2014

(51) Int. Cl.
*G06F 1/16* (2006.01)
*H05K 5/00* (2006.01)
*H05K 7/00* (2006.01)

(52) U.S. Cl.
USPC . 361/679.57; 361/725; 361/726; 361/679.27; 70/159; 292/302; 292/30

(58) Field of Classification Search
CPC ............ E05B 73/0005; E05B 73/0082; G06F 1/1679; G06F 21/88
USPC ............ 361/679.27, 679.57, 725–727; 70/58, 70/159–162; 292/8, 24, 30–32, 41, 42, 292/302, 332, 333, 335
See application file for complete search history.

(56) References Cited

U.S. PATENT DOCUMENTS

| 5,327,752 | A | | 7/1994 | Myers et al. |
|---|---|---|---|---|
| 5,361,610 | A | * | 11/1994 | Sanders ............................. 70/14 |
| 5,446,618 | A | * | 8/1995 | Tetsuya et al. ........... 361/679.37 |
| 5,787,737 | A | * | 8/1998 | Cho ................................... 70/58 |
| 5,987,937 | A | * | 11/1999 | Lee ................................... 70/14 |
| 6,590,547 | B2 | * | 7/2003 | Moriconi et al. ............... 345/30 |
| 6,937,468 | B2 | * | 8/2005 | Lin et al. ................. 361/679.41 |
| 7,038,908 | B2 | * | 5/2006 | Usui et al. ............... 361/679.41 |
| 7,380,143 | B2 | * | 5/2008 | Gold et al. ..................... 713/300 |
| 8,107,236 | B2 | * | 1/2012 | Lin ......................... 361/679.57 |
| 8,111,511 | B2 | * | 2/2012 | Ruch et al. ............... 361/679.57 |
| 8,230,707 | B2 | * | 7/2012 | Hung et al. ....................... 70/58 |
| 8,259,438 | B2 | * | 9/2012 | Hsiu ........................ 361/679.01 |
| 2004/0246666 | A1 | * | 12/2004 | Maskatia et al. ............... 361/683 |
| 2009/0141439 | A1 | * | 6/2009 | Moser ...................... 361/679.29 |
| 2010/0320884 | A1 | * | 12/2010 | Shiroishi et al. ........... 312/223.1 |

FOREIGN PATENT DOCUMENTS

| JP | 11-194852 | | 7/1999 |
|---|---|---|---|
| JP | 11-194852 | A | 7/1999 |
| JP | 2010-257202 | | 11/2010 |
| JP | 2010-257202 | A | 11/2010 |

* cited by examiner

*Primary Examiner* — Adrian S Wilson
*Assistant Examiner* — Abhishek Rathod
(74) *Attorney, Agent, or Firm* — Brian J. Pangrle (57) ABSTRACT

An assembly can include a first component; a second component; and an interconnection mechanism for pivotable interconnection of the first component and the second component about a pivot axis where the interconnection mechanism includes a latch mechanism to latch the second component to the interconnection mechanism, an actuator to unlatch the latch mechanism, an obstruction to obstruct actuation of the actuator, and a sliding bar slidable in a first direction to move the obstruction to an obstructing position that obstructs actuation of the actuator and slidable in a second direction to move the obstruction to an unobstructing position that permits actuation of the actuator. Various other apparatuses, systems, methods, etc., are also disclosed.

20 Claims, 8 Drawing Sheets

FIG. 8

LOCKING MECHANISM

TECHNICAL FIELD

Subject matter disclosed herein generally relates to technology for locking components.

BACKGROUND

Various types of computing devices, display devices, computing and display devices, etc. exist where, for example, one device may cooperate with another device or component of an assembly. As an example, consider a computing and touch display device that cooperates with a keyboard device, for example, to allow for input of information via the keyboard device in addition to, or as an alternative to, input of information via the touch display of the computing and touch display device. In such an example, the computing and touch display device and the keyboard device may interconnect via a physical interconnection mechanism. Various technologies and techniques described herein pertain to physical interconnections of devices, components, assemblies, etc. and, for example, locking mechanisms.

SUMMARY

An assembly can include a first component; a second component; and an interconnection mechanism for pivotable interconnection of the first component and the second component about a pivot axis where the interconnection mechanism includes a latch mechanism to latch the second component to the interconnection mechanism, an actuator to unlatch the latch mechanism, an obstruction to obstruct actuation of the actuator, and a sliding bar slidable in a first direction to move the obstruction to an obstructing position that obstructs actuation of the actuator and slidable in a second direction to move the obstruction to an unobstructing position that permits actuation of the actuator. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
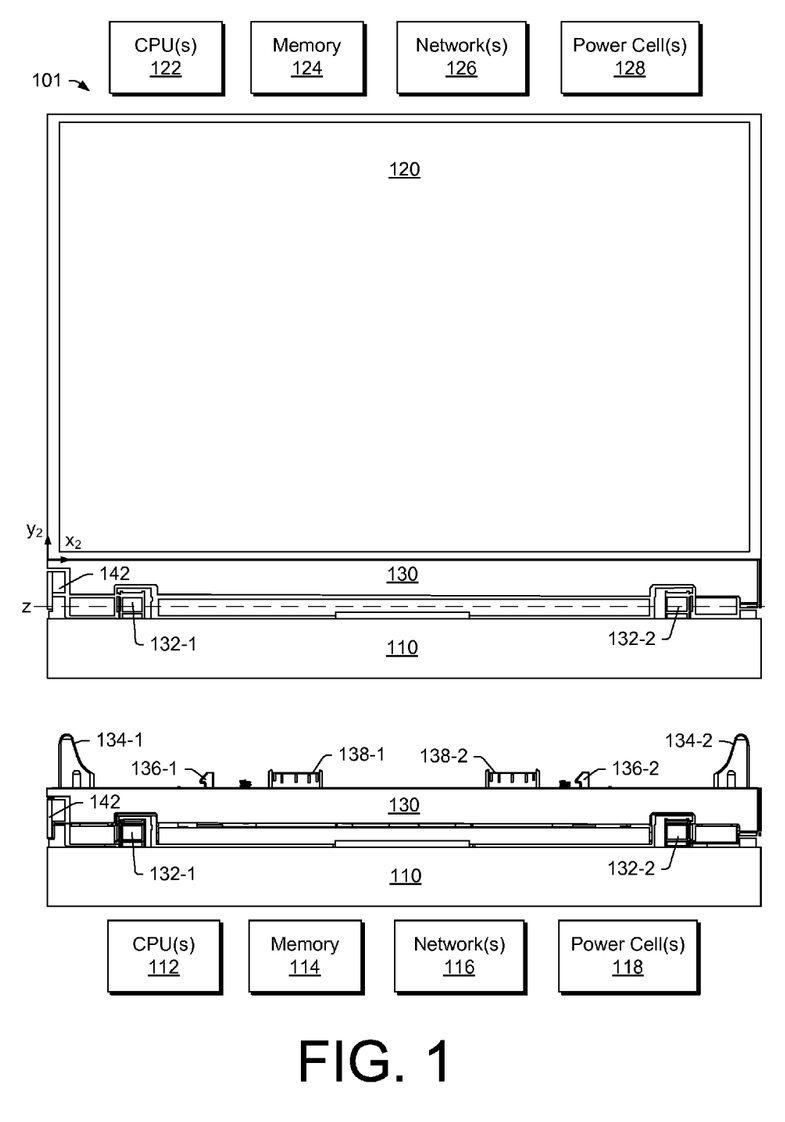
FIG. 1 is a diagram of an example of an assembly.

FIG. 1 shows an example of an assembly 101 that includes a base component 110, a display component 120 and an interconnection mechanism 130. In the example of FIG. 1, the base component 110 may include one or more processors 112, memory 114 (e.g., one or more memory devices), one or more network interfaces 116, and one or more power cells 118. In the example of FIG. 1, the display component 120 may include one or more processors 122, memory 124 (e.g., one or more memory devices), one or more network interfaces 126, and one or more power cells 128.

In the example of FIG. 1, the interconnection mechanism 130 can include one or more hinges 132-1, 132-2, one or more prongs 134-1, 134-2, one or more latches 136-1, 136-2, and one or more electrical connectors 138-1, 138-2. In the example of FIG. 1, the interconnection mechanism 130 includes an actuator 142 to unlatch a latch mechanism that includes the latches 136-1, 136-2 for latching the display component 120 to the interconnection mechanism 130. Thus, upon actuation of the actuator 142 (e.g., depressing a button, etc.), the latches 136-1, 136-2 (e.g., translatable hook shaped latches, etc.) can unlatch the display component 120, which can then be disconnected from the interconnection mechanism 130.

In the example of FIG. 1, the interconnection mechanism 130 includes the one or more hinges 132-1, 132-2 for pivotable interconnection of the base component 110 and the display component 120. For example, a hinge may define a pivot axis (e.g., via an axel, etc.) about which one or more components may pivot. In the example of FIG. 1, the display component 120 may, when connected to the interconnection mechanism 130, pivot in a range of at least 90 degrees and optionally up to about 360 degrees with respect to the base component 110. In such an example, the display component 120 may be positioned in a closed state, for example, pivoted downward toward the base component 110, in an angled open state, for example, as shown in FIG. 1, and optionally in a flat state where the display component 120 and the base component 110 are substantially in the same plane. For example, the display component 120 may be defined with respect to a coordinate system (e.g., $x_2$, $y_2$), the base component 110 may be defined with respect to another coordinate system (e.g., $x_1$, $y_1$) and a pivot axis may be defined by a cylindrical coordinate system (e.g., r, z, Θ) where the "y" coordinates of the display component 120 and the base component 110 may define an angle Θ about the axis z.

Where one component can physically connect and disconnect from another component, as an example, an interconnection mechanism may provide for locking the two components in a physically connected state. For example, an obstruction may be positioned that physically impedes an actuator to place the interconnection mechanism in an obstructed state; whereas, in an unobstructed state, the actuator would allow for disconnection of one of the two components.

Figure 2:
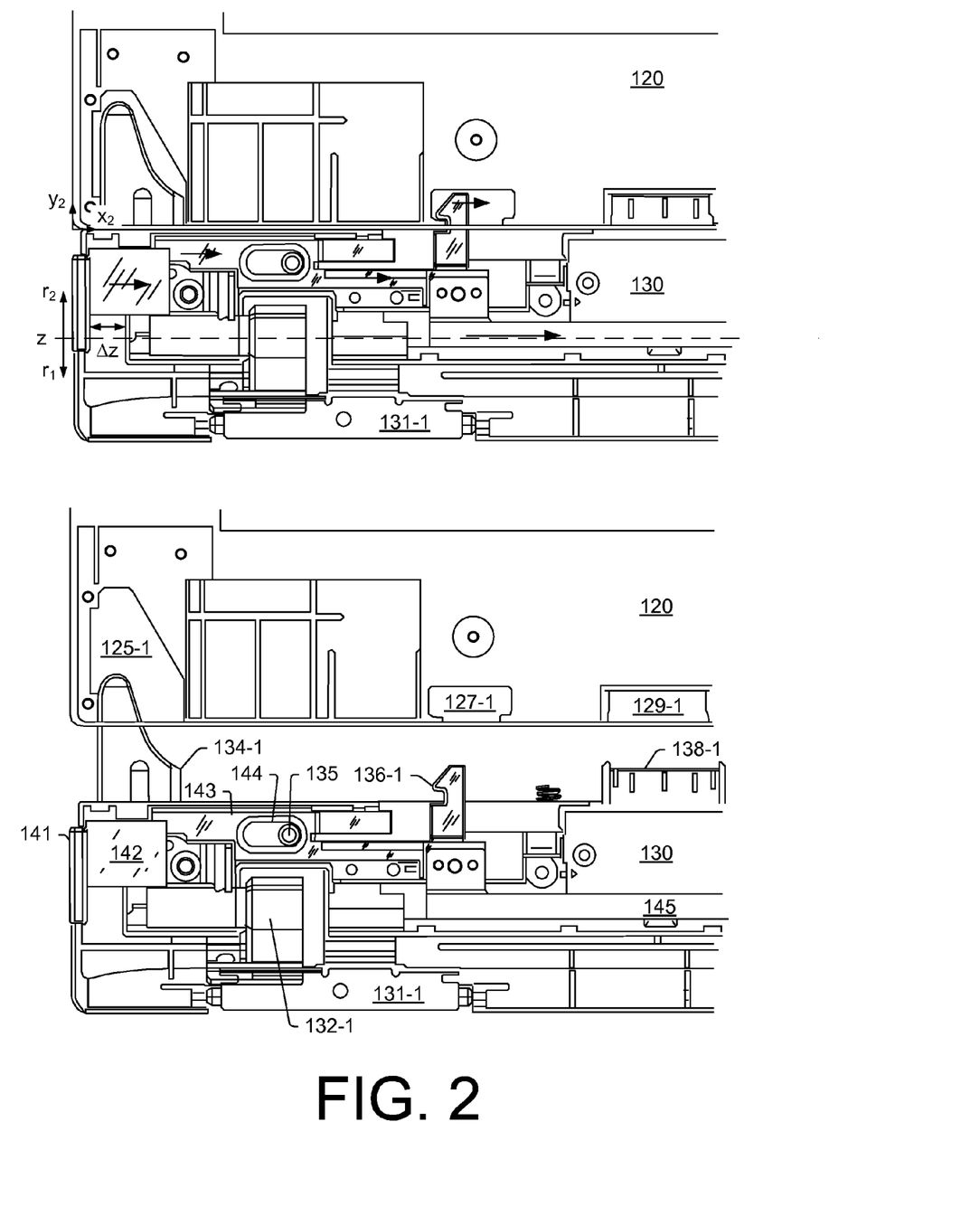
FIG. 2 is a diagram of an example of an assembly that includes a latch mechanism actuatable by an actuator.

FIG. 2 shows various parts of the assembly 101 of FIG. 1 in a connected state (upper) and a disconnected state (lower). In particular, FIG. 2 shows a portion of the display component 120 and a portion of the interconnection mechanism 130. As shown in the example of FIG. 2, the display component 120 includes a socket 125-1 for receipt of the prong 134-1 of the interconnection mechanism 130, a socket 127-1 for receipt of the latch 136-1 of the interconnection mechanism 130 and a socket 129-1 for receipt of the electrical connector 138-1 of the interconnection mechanism 130.

Further, in the example of FIG. 2, the interconnection mechanism 130 includes a brace 131-1, which may be provided for attaching the base component 110 (not shown) to the interconnection mechanism 130. For example, a screw, bolt, etc., may be used to attach the base component 110 to the interconnection mechanism 130.

Yet further, in the example of FIG. 2, the interconnection mechanism 130 includes a peg 135, which cooperates with the actuator 142. More particularly, in the example of FIG. 2, the actuator 142 includes an actuator surface 141 that when translated axially inwardly a distance $\Delta z$ (e.g., in an axial direction parallel to the pivot axis of the hinge 132-1), causes an arm 143 having a guide opening 144 to be guided axially to the right where the latch 136-1, which is attached to the arm 143 also translates axially to the right, which moves the latch 136-1 to a more central position with respect to the socket 127-1 of the display component 120 such that a hook end of the latch 136-1 clears an inner surface of the socket 127-1. Also shown is an extension 145, which connects to, for example, the latch 136-2 (see, e.g., FIG. 1). Thus, if a user desires to disconnect the display component 120, the user may apply force axially to the surface 141 of the actuator 142 to thereby shift the latches 136-1, 136-2 (see, e.g., FIG. 1) within respective sockets 127-1, 127-2 (not shown in FIG. 2) and then slide the display component 120 to remove the prongs 134-1, 134-2 (see, e.g., FIG. 1) from the sockets 125-1, 125-2 (not shown in FIG. 2).

In the example of FIG. 2, the brace 131-1 is part of the hinge 132-1 such that the interconnection mechanism 130 can pivot with respect to the base component 110 when the base component 110 is attached to the brace 131-1. As the display component 120 connects to the interconnection mechanism 130 in a releasable manner (e.g., latch/unlatch), when connected to the interconnection mechanism 130, the display component 120 pivots with the interconnection mechanism 130 and with respect to the base component 110 when the base component 110 is attached to the brace 131-1 of the interconnection mechanism 130.

Figure 3:
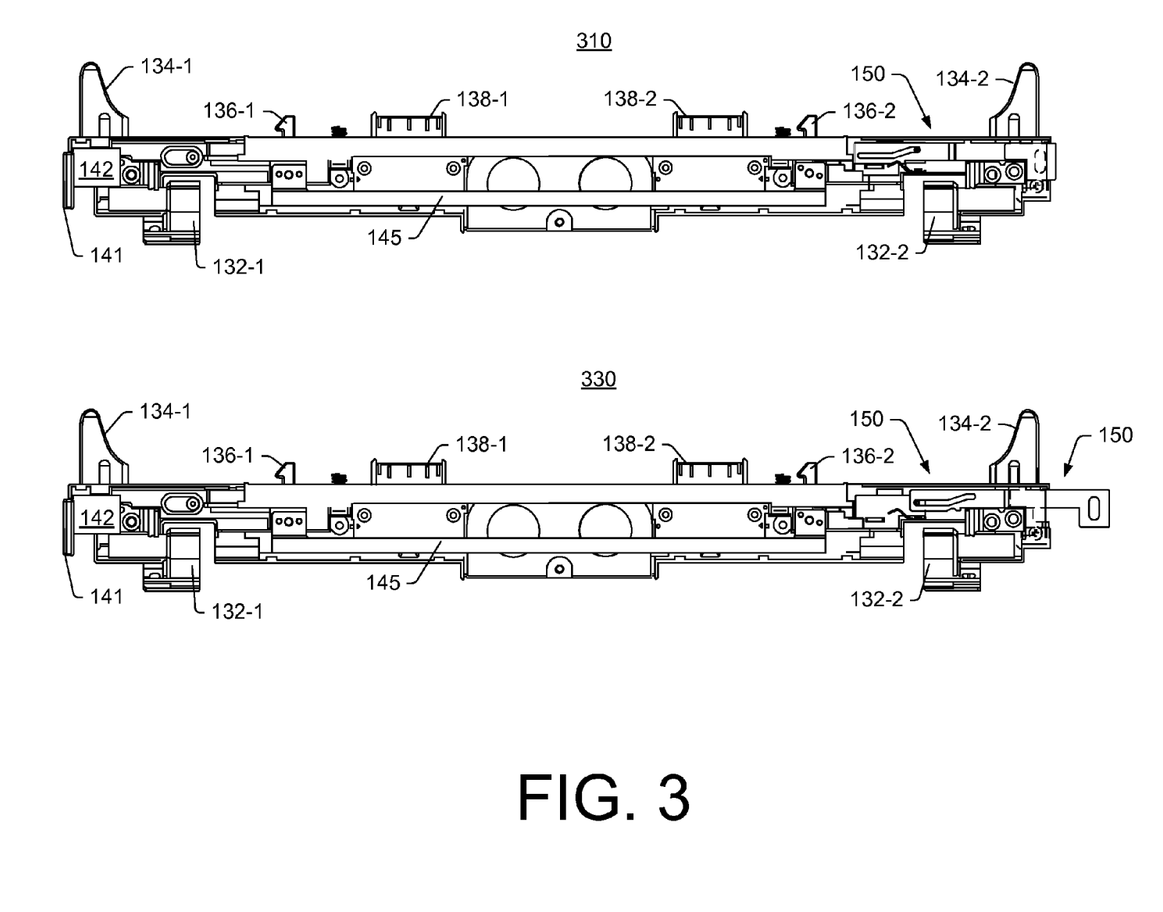
FIG. 3 is a diagram of an example an interconnection mechanism in an unobstructed state and in an obstructed state with respect to the actuator of FIG. 2.

FIG. 3 shows an example of the interconnection mechanism 130 in an unobstructed state 310 and in an obstructed state 330. In the example of FIG. 3, an obstruction mechanism 150 can place the interconnection mechanism 130 in the unobstructed state 310 or in the obstructed state 330.

Figure 4:
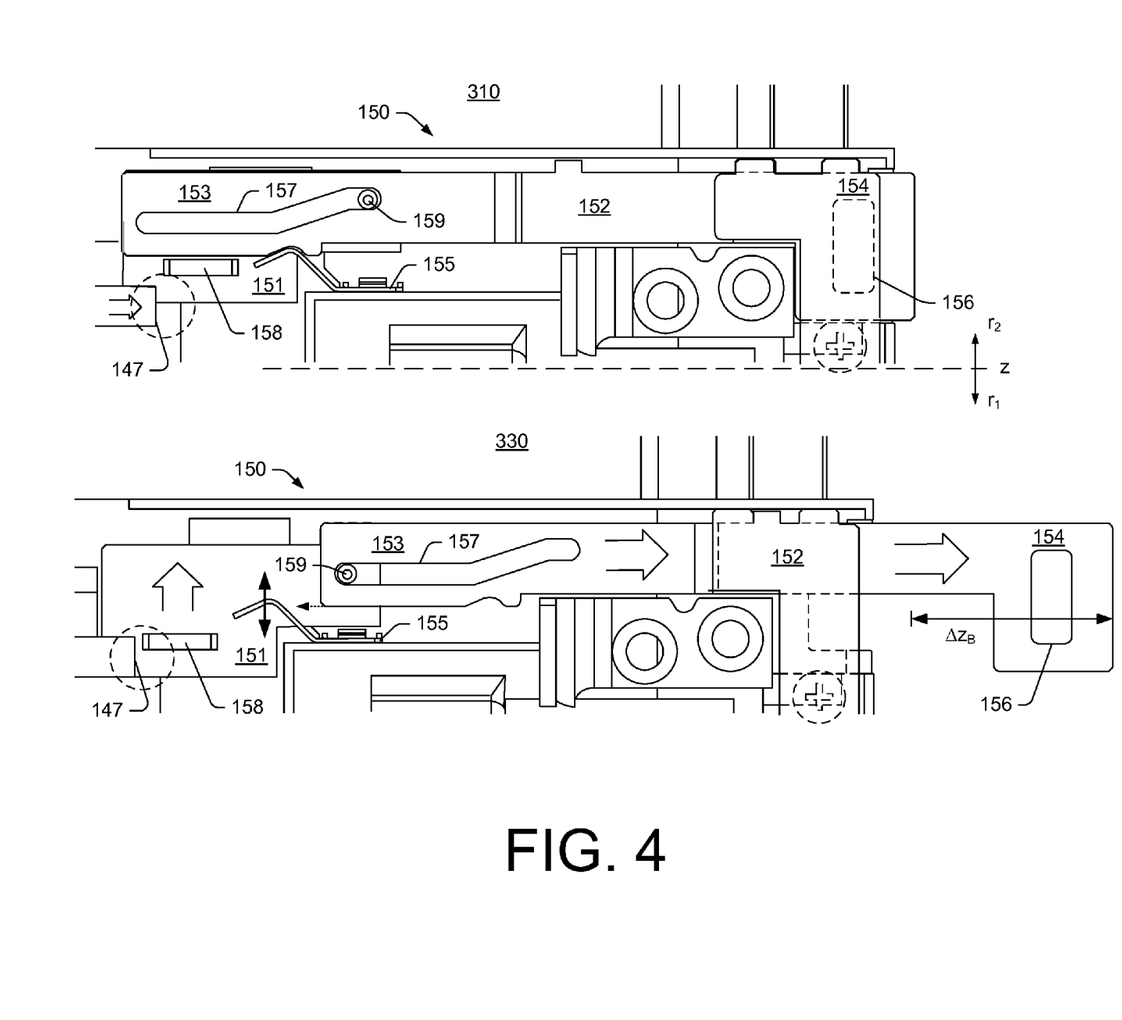
FIG. 4 is a diagram of an example of an obstruction and a slidable bar in an unobstructed state and in an obstructed state with respect to an actuator.

FIG. 4 shows enlarged views of a portion of the interconnection 130 in the unobstructed state 310 and in the obstructed state 330. As shown in the example of FIG. 4, the obstruction mechanism 150 includes a plate 151 with an obstruction 158 and a sliding bar 152 where sliding the sliding bar 152 in a first direction moves the plate 151 and the obstruction 158 to an obstructing position (e.g., the obstructed state 330 that obstructs actuation of the actuator) and where sliding the sliding bar 152 in a second direction (e.g., opposite the first direction) moves the plate 151 and the obstruction 158 to an unobstructing position (e.g., the unobstructed state 310 that permits actuation of the actuator 142). In particular, the obstruction 158 obstructs a portion 147 of the actuator 142, which may be an end (e.g., a distal end, a blunt end, etc.) of the actuator 142. In such an example, the surface 141 may be at a proximate end of the actuator 142 while the portion 147 may be at a distal end of the actuator 142.

In the example of FIG. 4, the plate 151 includes a peg 159 and the sliding bar 152 includes an inner portion 153 and an outer portion 154 where the inner portion 153 includes a guide 157 that guides the peg 159 of the plate 151 upon sliding of the sliding bar 152. Further, in the example of FIG. 4, the obstruction mechanism 150 includes a spring unit 155 that biases the inner portion 153 of the sliding bar 152, for example, such that some amount of force is required to slide the sliding bar 152 axially outwardly, which may be assisted, for example, via an opening 156 in the outer portion 154 of the sliding bar 152. For example, the inner portion 153 of the sliding bar 152 may include a recess in an edge shaped to mate with a surface of a spring of the spring unit 155 (e.g., which may be attached to the interconnection mechanism 130).

In the example of FIG. 4, the guide 157 has an upper end and a lower end such that upon sliding of the sliding bar 152, the peg 159 of the plate 151 is engaged by the guide 157 to position the peg 159 at the upper end to cause the obstruction 158 of the plate 151 to be in the unobstructed state 310 with respect to the portion 147 of the actuator 142 or at the lower end to cause the obstruction 158 of the plate 151 to be in the obstructed state 330 with respect to the portion 147 of the actuator 142.

In the example of FIG. 4, by translating the sliding bar 152 inwardly or outwardly axially (e.g., in a direction parallel to the z axis), the plate 151 moves up or down in an orthogonal direction, respectively (e.g., generally in a radial direction $r_2$ away or toward the axis z). As an example, the lower end of the guide 157 may have an axial length that is greater than an axial length of the upper end of the guide 157. In such a manner, some axial movement of the sliding bar 152 may occur without causing the plate 151, and hence the obstruction 158, from moving. For example, where the opening 156 of the outer portion 154 of the sliding bar 152 is available for receipt of a cable, a spindle, a shackle, etc., the freedom of movement may facilitate positioning of the cable, the spindle, the shackle, etc. (e.g., without altering the position of the plate 151 and obstruction 158.

As an example, an assembly can include a first component; a second component; and an interconnection mechanism for pivotable interconnection of the first component and the second component about a pivot axis where the interconnection mechanism includes a latch mechanism to latch the second component to the interconnection mechanism, an actuator to unlatch the latch mechanism, an obstruction to obstruct actuation of the actuator, and a sliding bar slidable in a first direction to move the obstruction to an obstructing position that obstructs actuation of the actuator and slidable in a second direction to move the obstruction to an unobstructing position that permits actuation of the actuator. In such an example, the second component may include a display, the first component may include keyboard, at least one of the first component and the second component can include a processor and memory, etc.

As an example, where a sliding bar includes an opening, the opening may be exposed for an obstructing position (e.g., for obstructing an actuator) and concealed for an unobstructing position (e.g., for unobstructing an actuator). As an example, a sliding bar can be or include a piece of metal that includes an opening configured for receipt of at least a cable, a spindle or a shackle.

As an example, an obstruction and a sliding bar of an obstruction mechanism can include a conversion mechanism that converts axial sliding of the sliding bar to orthogonal movement of the obstruction. For example, the obstruction may include a pin (e.g., or peg) and the sliding bar may include an angled slot that receives the pin (e.g., or peg).

As an example, an actuator can include an actuation surface at a proximate end and an axial extension that extends to a distal end where at an obstructing position of an obstruction obstructs axial movement of the distal end of the actuator responsive to application of axial force to the actuation surface. As an example, an axial extension can carry a latch mechanism. As an example, a latch mechanism can include at least one hook to hook a second component to an interconnection mechanism. As an example, a sliding bar can include a handle for carrying an assembly with an obstruction in an obstructing position (e.g., to obstruct an actuator).

As an example, a method can include providing an interconnection mechanism for pivotable interconnection of a first component and a second component about a pivot axis; providing an actuator for, upon actuation, disconnecting the second component from the interconnection mechanism; providing a sliding bar positionable in an obstructing position to obstruct the actuation of an actuator and positionable in an unobstructing position to permit the actuation of the actuator; providing the first component and the second component pivotably interconnected via the interconnection mechanism; and positioning the sliding bar in the unobstructing position. In such an example, the method may include positioning the sliding bar in the obstructing position. As an example, a method can include inserting in an opening of a sliding bar a cable, a spindle or a shackle.

Figure 5:
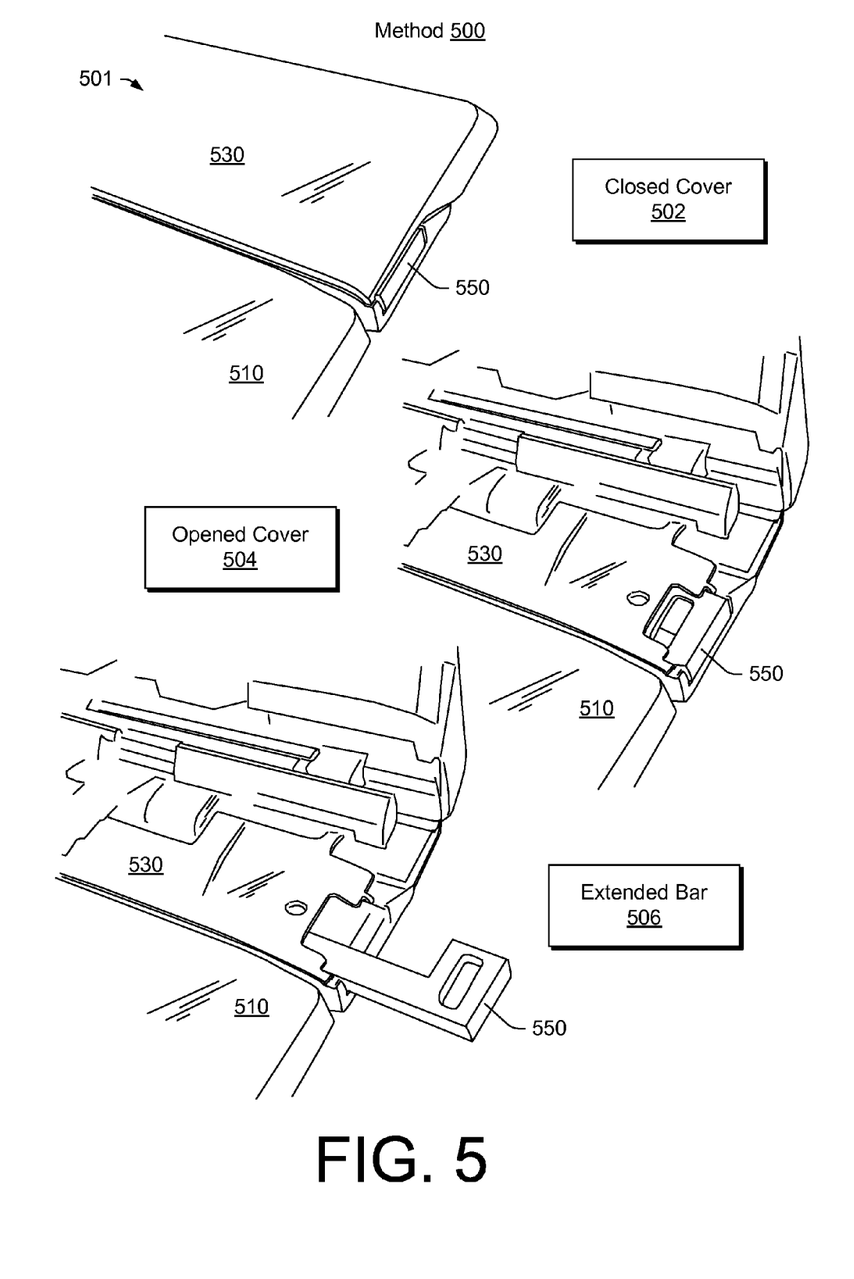
FIG. 5 is a diagram of an example of a method and an example of an assembly.

FIG. 5 shows an example of a method 500 and an example of an assembly 501. The assembly 501 includes a base component 510 and an interconnection mechanism 530, which includes a sliding bar 550. In the example of FIG. 5, the method 500 includes a closed cover block 502 for providing the assembly 501 with a closed cover, an opened cover block 504 for providing the assembly 501 with an opened cover, and an extended bar block 506 for providing the assembly 501 with an extended bar.

As an example, a user may perform actions such as opening a cover, closing a cover, extending a bar, etc. In such an example, opening a cover may open a cover of an interconnection mechanism to expose various features for receipt of a component by the interconnection mechanism (see, e.g., opened cover block 504); whereas, closing a cover may close the cover of the interconnection mechanism to conceal various features of the interconnection mechanism, for example, for storage of a base and interconnection mechanism assembly (see, e.g., closed cover block 502). As to extending a bar, a user may open a cover of an interconnection mechanism (e.g., via opening of a display component, etc.) to reveal an opening of a sliding bar, for example, to facilitate access to the sliding bar for purposes of sliding the bar axially outwardly, which may act to lock a latch mechanism, obstruct an actuator, etc.

Figure 6:
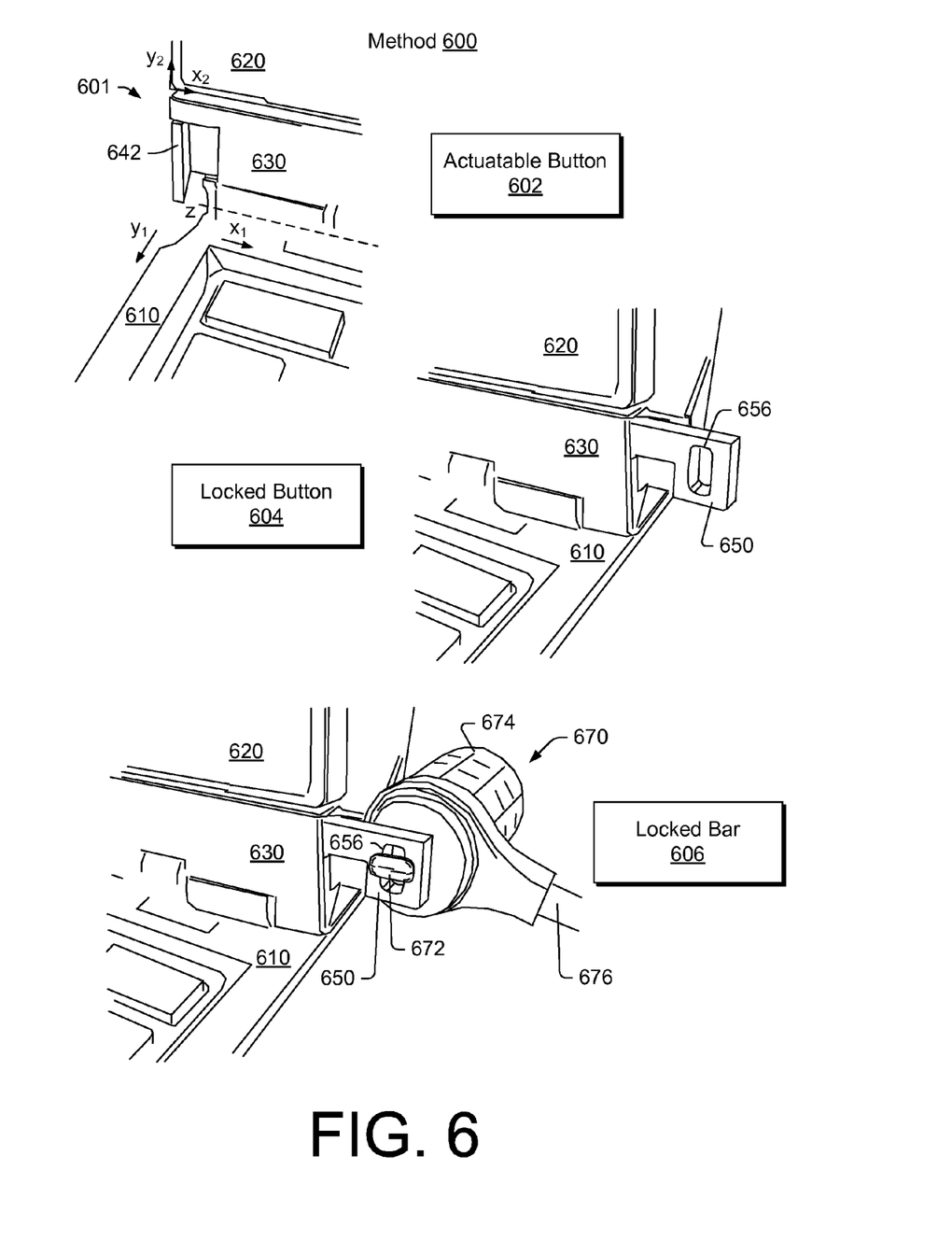
FIG. 6 is a diagram of an example of a method and an example of an assembly.

FIG. 6 shows an example of a method 600 and an example of an assembly 601. The assembly 601 includes a base component 610, a display component 620 and an interconnection mechanism 630, which includes an actuator 642 and a sliding bar 650. As shown, the various components may be defined with respect to one or more coordinate systems (e.g., $x_2, y_2$; $x_1, y_1$; z, etc.). In the example of FIG. 6, the method 600 includes a actuatable button block 602 for providing the assembly 601 with an actuatable button (e.g., the actuator 642) at a proximate end, a locked button block 604 for providing the assembly 601 with a locked or unactuatable button (e.g., by extension of the sliding bar 650), and a locked bar block 606 for providing the assembly 601 with a lock 670 that includes a spindle 672, a lock body 674 and a cable 676 where the spindle 672 is received by an opening 656 of the sliding bar 650 to prevent sliding of the sliding bar 650 to a position that would cause unobstruction of the actuatable button to thereby place the assembly 601 in an unlocked state. Thus, the lock 670 can place the assembly 601 in a locked state such that the display component 620 cannot be physically disconnected from the interconnection mechanism 630 via a process that would involve actuation of the actuator 642.

Figure 7:
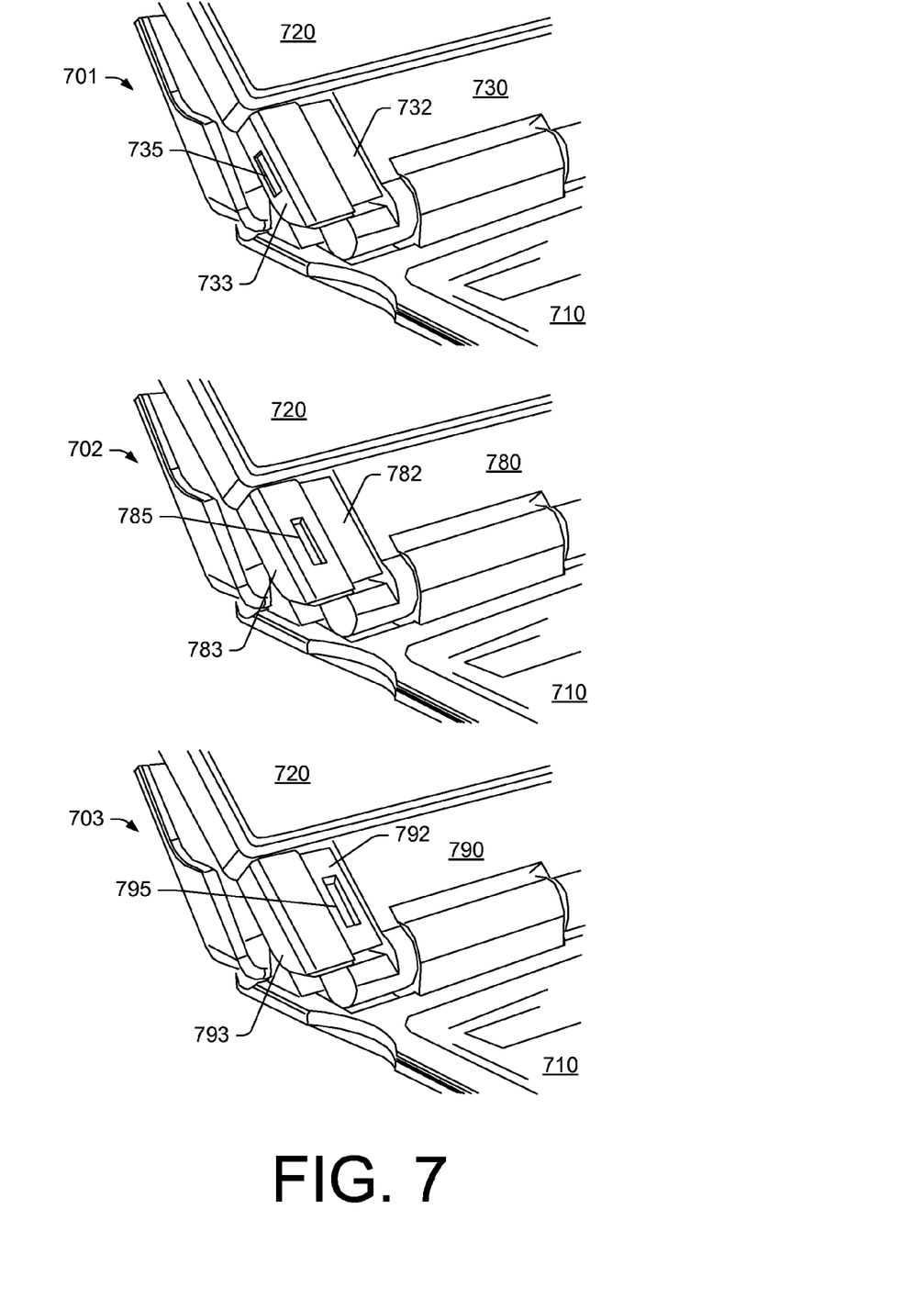
FIG. 7 is a diagram of examples of assemblies.

FIG. 7 shows examples of assemblies 701, 702 and 703, where each of the assemblies includes a base component 710, a display component 720 and an interconnection mechanism 730, 780 or 790. As to the assembly 701, the interconnection mechanism 730 includes a socket 732 for receipt of a button 733 that includes an opening 735 (e.g., a slot, etc.), the opening configured for receipt of a spindle of a lock such as the spindle 672 of the lock 670 of FIG. 6. As to the assembly 702, the interconnection mechanism 780 includes a socket 782 for receipt of a button 783 that includes an opening 785 (e.g., a slot, etc.), the opening configured for receipt of a spindle of a lock such as the spindle 672 of the lock 670 of FIG. 6. As to the assembly 703, the interconnection mechanism 790 includes a socket 792 for receipt of a button 793 where the socket 792 includes an opening 795 (e.g., a slot, etc.), the opening configured for receipt of a spindle of a lock such as the spindle 672 of the lock 670 of FIG. 6. In the various examples of FIG. 7, once an object (e.g., a spindle, etc.) is received via an opening (e.g., a slot, etc.), such an object may obstruct actuation of a button.

In the various examples of FIG. 7, a spindle inserted into one of the openings 735, 785 or 795 impedes movement of a respective one of the buttons 733, 783, or 793 to lock a respective one of the assemblies 701, 702, or 703 in a locked state such that the display component 720 cannot be disconnected from a respective one of the interconnection mechanisms 730, 780 or 790.

As an example, an assembly can include a first component that includes a keyboard; a second component that includes a display and a processor; an interconnection mechanism for pivotable interconnection of the first component and the second component about a pivot axis where the interconnection mechanism includes a latch mechanism to latch the second component to the interconnection mechanism, an actuator to unlatch the latch mechanism, and a piece that comprises a slot for receipt of an obstruction to obstruct actuation of the actuator (e.g., where the slot may be in the button, in a seat for the button, in the end of the sliding bar, etc.). In such an example, the piece can include a sliding bar positionable to expose the slot and positionable to conceal the slot, the piece can include a depressible button coupled to the actuator or the piece can forms a seat to seat a depressible button coupled to the actuator where, in a depressed state, the depressible button covers the slot.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 8:
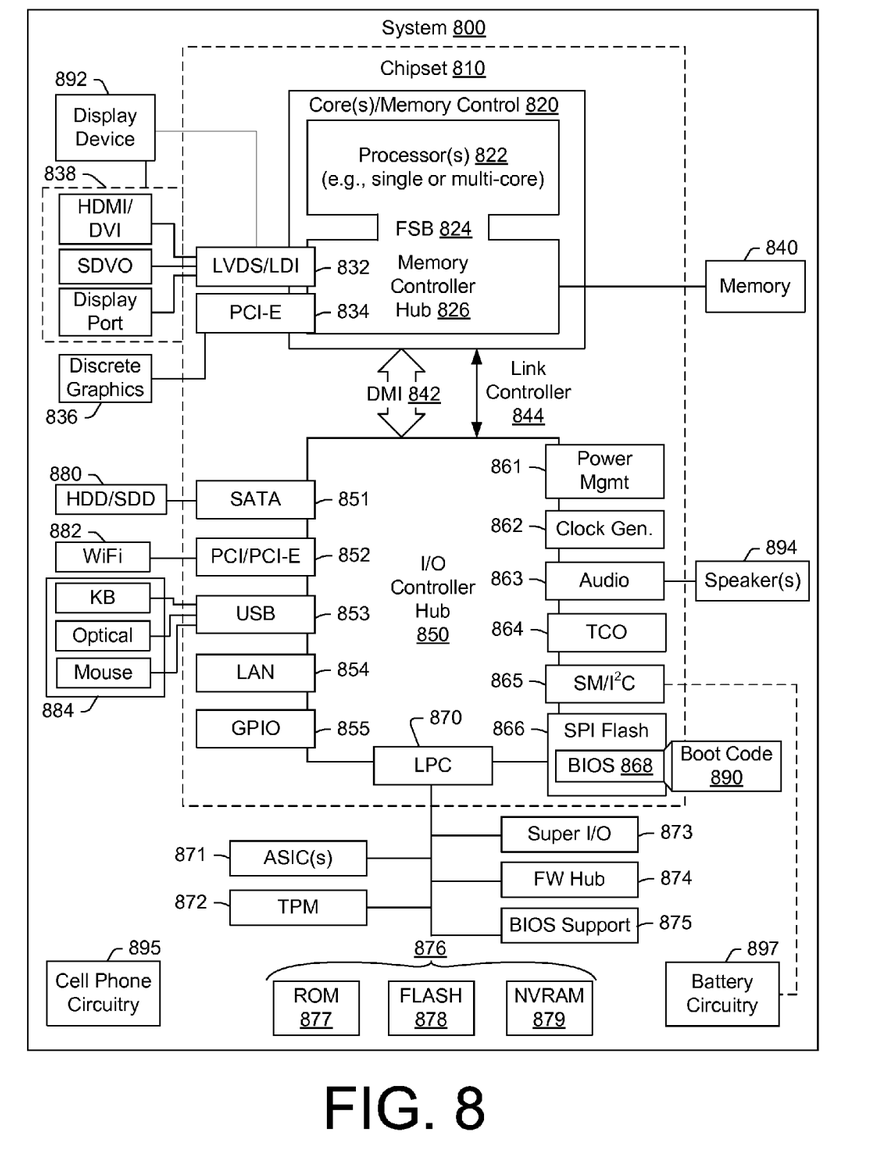
FIG. 8 is a diagram of an example of a system that includes one or more processors.

While various examples of circuits or circuitry have been discussed, FIG. 8 depicts a block diagram of an illustrative computer system 800. The system 800 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 800. As an example, a device such as one or more of the components of FIG. 1 may include at least some of the features of the system 800.

As shown in FIG. 8, the system 800 includes a so-called chipset 810. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for reading, writing or reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), one or more optical sensors, mice and various other devices (e.g., microphones, cameras, phones, storage, media players, etc.). On or more other types of sensors may optionally rely on the USB interface 853 or another interface (e.g., I²C, etc.). As to microphones, the system 800 of FIG. 8 may include hardware (e.g., audio card) appropriately configured for receipt of sound (e.g., user voice, ambient sound, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879. With respect to the TPM 872, this module may be in the form of a chip that can be used to authenticate software and hardware devices. For example, a TPM may be capable of performing platform authentication and may be used to verify that a system seeking access is the expected system.

The system 800, upon power on, may be configured to execute boot code 890 for the BIOS 868, as stored within the SPI Flash 866, and thereafter processes data under the control of one or more operating systems and application software (e.g., stored in system memory 840). An operating system may be stored in any of a variety of locations and accessed, for example, according to instructions of the BIOS 868. Again, as described herein, a satellite, a base, a server or other machine may include fewer or more features than shown in the system 800 of FIG. 8. Further, the system 800 of FIG. 8 is shown as optionally include cell phone circuitry 895, which may include GSM, CDMA, etc., types of circuitry configured for coordinated operation with one or more of the other features of the system 800. Also shown in FIG. 8 is battery circuitry 897, which may provide one or more battery, power, etc., associated features (e.g., optionally to instruct one or more other components of the system 800). As mentioned, a SMBus may be operable via a LPC (see, e.g., the LPC interface 870), via an I²C interface (see, e.g., the SM/I²C interface 865), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An assembly comprising:
   a first component;
   a second component; and an interconnection mechanism for pivotable interconnection of the first component and the second component about a pivot axis wherein the interconnection mechanism comprises
  a latch mechanism to latch the second component to the interconnection mechanism,
  an actuator to unlatch the latch mechanism,
  an obstruction to obstruct actuation of the actuator, and
  a sliding bar slidable in a first direction to move the obstruction to an obstructing position that obstructs actuation of the actuator and slidable in a second direction to move the obstruction to an unobstructing position that permits actuation of the actuator.

2. The assembly of claim 1 wherein the second component comprises a display.

3. The assembly of claim 1 wherein the first component comprises a keyboard.

4. The assembly of claim 1 wherein at least one of the first component and the second component comprises a processor and memory.

5. The assembly of claim 1 wherein the sliding bar comprises an opening, the opening exposed for the obstructing position and the opening concealed for the unobstructing position.

6. The assembly of claim 1 wherein the sliding bar comprises a piece of metal that comprises an opening configured for receipt of at least one member selected from a group consisting of a cable, a spindle and a shackle.

7. The assembly of claim 1 wherein the sliding bar comprises a handle for carrying the assembly with the obstruction in the obstructing position.

8. The assembly of claim 1 wherein the obstruction and the sliding bar comprise a conversion mechanism that converts axial sliding of the sliding bar to orthogonal movement of the obstruction.

9. The assembly of claim 8 wherein the obstruction comprises a pin and wherein the sliding bar comprises an angled slot that receives the pin.

10. The assembly of claim 1 wherein the interconnection mechanism comprises a plurality of hinges.

11. The assembly of claim 1 wherein the actuator comprises an actuation surface at a proximate end and an axial extension that extends to a distal end wherein the obstructing position of the obstruction obstructs axial movement of the distal end of the actuator responsive to application of axial force to the actuation surface.

12. The assembly of claim 11 wherein the axial extension carries the latch mechanism.

13. The assembly of claim 12 wherein the latch mechanism comprises at least one hook to hook the second component.

14. A method comprising:
  providing an interconnection mechanism for pivotable interconnection of a first component and a second component about a pivot axis;
  providing an actuator for, upon actuation, disconnecting the second component from the interconnection mechanism;
  providing a sliding bar positionable in an obstructing position to obstruct the actuation of an actuator and positionable in an unobstructing position to permit the actuation of the actuator;
  providing the first component and the second component pivotably interconnected via the interconnection mechanism; and
  positioning the sliding bar in the unobstructing position.

15. The method of claim 14 comprising positioning the sliding bar in the obstructing position.

16. The method of claim 15 comprising inserting in an opening of the sliding bar a member selected from a group consisting of a cable, a spindle and a shackle.

17. An assembly comprising:
  a first component that comprises a keyboard;
  a second component that comprises a display and a processor; and
  an interconnection mechanism for pivotable interconnection of the first component and the second component about a pivot axis wherein the interconnection mechanism comprises
    a latch mechanism to latch the second component to the interconnection mechanism,
    an actuator to unlatch the latch mechanism,
    an obstruction to obstruct actuation of the actuator, and
    a sliding bar slidable in a first direction to move the obstruction to an obstructing position that obstructs actuation of the actuator and slidable in a second direction to move the obstruction to an unobstruction position that permits actuation of the actuator.

18. The assembly of claim 17 wherein the sliding bar comprises a slot for receipt of a different obstruction wherein sliding bar is positionable to expose the slot and positionable to conceal the slot.

19. The assembly of claim 17 further comprising a depressible button coupled to the actuator wherein the depressible button comprises a slot for receipt of a different obstruction that limits depression of the depressible button.

20. The assembly of claim 17 further comprising a depressible button coupled to the actuator and a piece that forms a seat to seat the depressible button wherein the piece comprises a slot for receipt of a different obstruction that limits depression of the depressible button and wherein, in a depressed state without the different obstruction received by the slot, the depressible button covers the slot.

* * * * *